(12) United States Patent
Shen

(10) Patent No.: US 7,907,903 B2
(45) Date of Patent: Mar. 15, 2011

(54) BLUETOOTH HANDS-FREE CAR KIT

(76) Inventor: Wen Hong Shen, Taipei (TW)

( * ) Notice: Subject to any disclaimer, the term of this patent is extended or adjusted under 35 U.S.C. 154(b) by 451 days.

(21) Appl. No.: 12/215,895

(22) Filed: Jul. 1, 2008

(65) Prior Publication Data

US 2010/0003919 A1 Jan. 7, 2010

(51) Int. Cl.
*H04B 7/00* (2006.01)
(52) U.S. Cl. .................. 455/41.2; 455/569.1; 455/569.2; 455/575.1; 345/163
(58) Field of Classification Search .............. 455/41.2, 455/569.1, 569.2, 575.1, 90.3, 99, 345; 345/163, 345/164
See application file for complete search history.

(56) References Cited

U.S. PATENT DOCUMENTS

| | | | |
|---|---|---|---|
| 6,236,868 B1 * | 5/2001 | Lygas | 455/569.2 |
| 6,463,278 B2 * | 10/2002 | Kraft et al. | 455/418 |
| 6,636,749 B2 * | 10/2003 | Holmes et al. | 455/569.2 |
| 6,697,638 B1 * | 2/2004 | Larsson et al. | 455/553.1 |
| 6,812,942 B2 * | 11/2004 | Ribak | 345/30 |
| 6,889,065 B2 * | 5/2005 | Holmes et al. | 455/569.2 |
| 6,892,051 B2 * | 5/2005 | Schmitt et al. | 455/41.2 |
| 6,957,090 B2 * | 10/2005 | Lejman et al. | 455/569.1 |
| 7,006,851 B2 * | 2/2006 | Holmes et al. | 455/569.2 |
| 7,099,706 B2 * | 8/2006 | Lejman et al. | 455/569.1 |
| 7,308,231 B2 * | 12/2007 | Tung | 455/41.2 |
| 7,333,837 B2 * | 2/2008 | Gordeyev | 455/569.2 |
| 7,610,016 B2 * | 10/2009 | Schmitt et al. | 455/41.2 |
| 2002/0085043 A1 * | 7/2002 | Ribak | 345/810 |
| 2002/0142803 A1 * | 10/2002 | Yamamoto | 455/557 |
| 2004/0214525 A1 * | 10/2004 | Ahn et al. | 455/41.2 |
| 2005/0287958 A1 * | 12/2005 | Jui Sheng et al. | 455/88 |
| 2006/0009154 A1 * | 1/2006 | Tung | 455/41.2 |
| 2008/0162120 A1 * | 7/2008 | Mactavish et al. | 704/201 |
| 2008/0280636 A1 * | 11/2008 | Kim | 455/515 |
| 2008/0318517 A1 * | 12/2008 | Bury | 455/3.02 |
| 2009/0061769 A1 * | 3/2009 | Zimbric et al. | 455/41.2 |
| 2009/0098903 A1 * | 4/2009 | Donaldson et al. | 455/552.1 |
| 2009/0186576 A1 * | 7/2009 | Peng | 455/41.2 |

* cited by examiner

*Primary Examiner* — Minh D Dao

(57) ABSTRACT

A bluetooth hands-free car kit includes a hands-free cell phone/PDA holder electrically connected to the internal electric circuit of a car for receiving and amplifying sound, a bluetooth adapter insertable into the hands-free cell phone/PDA holder for wireless communication with a cell phone/PDA through a bluetooth communication technique, and an audio transmitter receiver device insertable into the bluetooth adapter for receiving and transmitting audio signals. The bluetooth adapter has a pivoted clip biased by a spring member for engaging a retaining notch on one lateral side of the audio transmitter receiver device to lock the audio transmitter receiver device to the bluetooth adapter upon insertion of the audio transmitter receiver device into the bluetooth adapter.

1 Claim, 4 Drawing Sheets

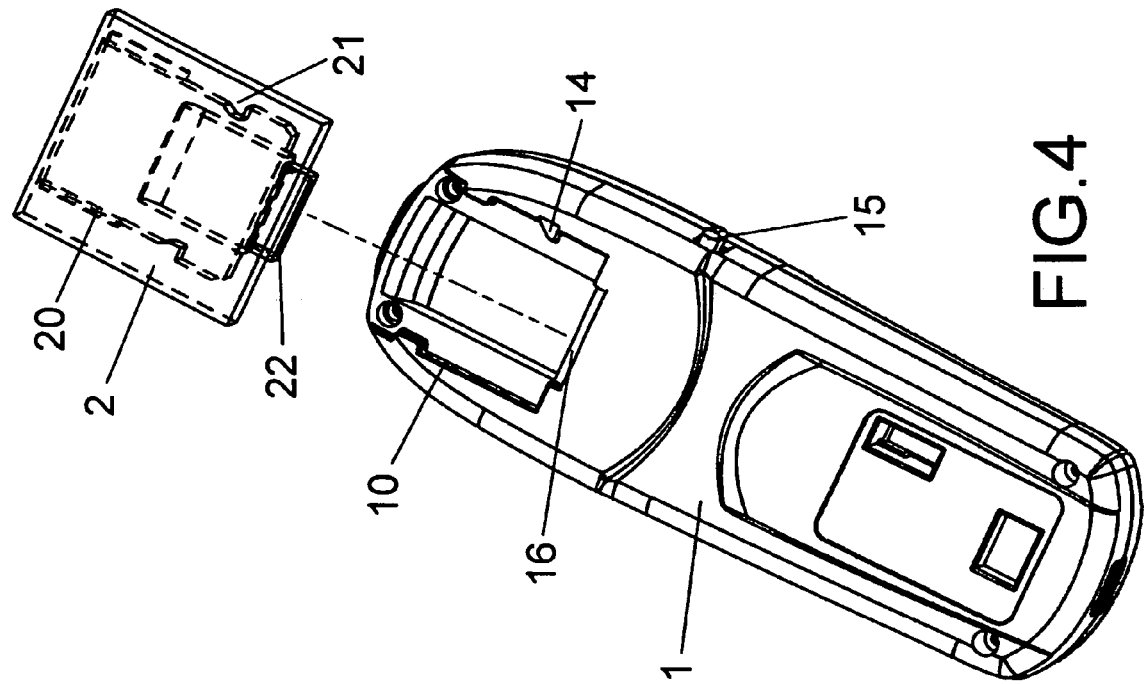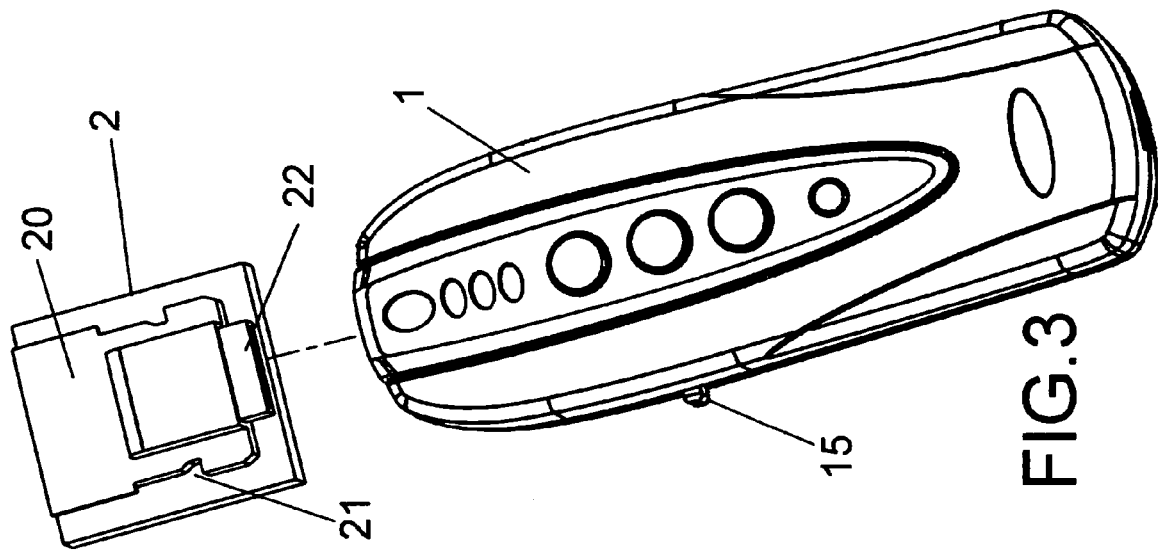

BLUETOOTH HANDS-FREE CAR KIT

BACKGROUND OF THE INVENTION

1. Field of the Invention

The present invention relates to a hands-free kit and more particularly, a bluetooth hands-free car kit.

2. Description of the Related Art

A hands-free cell phone/PDA holder may be used in a car so that a user can use a cell phone/PDA in a hands free mode. However, before using a cell phone/PAD in a hands free mode in a car, the user must insert the cell phone/PDA into the hands-free cell phone/PDA holder that is provided in the car. However, a hands-free cell phone/PDA holder fits only one particular model of cell phone/PDA. For a different model of cell phone/PDA, a different hands-free cell phone/PDA holder shall be used. To eliminate this problem, bluetooth adapter systems are created. German 40111071 shows an exemplar. By means of inserting a bluetooth adapter system into a hands-free cell phone/PDA holder in a car, different models of cell phones/PDAs can be used in the car in a hands free mode. According to German 40111071, the audio transmitter receiver device is vertically mounted in the bluetooth adapter. During installation, the user must make sure that the audio transmitter receiver device has been vertically downwardly inserted into position.

SUMMARY OF THE INVENTION

The present invention has been accomplished under the circumstances in view. It is one object of the present invention to provide a bluetooth hands-free car kit, which allows free operation of a cell phone/PDA in a hands free mode at any place in the car.

To achieve this and other objects of the present invention, the bluetooth hands-free car kit includes a hands-free cell phone/PDA holder electrically connected to the internal electric circuit of a car for receiving and amplifying sound, a bluetooth adapter insertable into the hands-free cell phone/PDA holder for wireless communication with a cell phone/PDA through a bluetooth communication technique, and an audio transmitter receiver device insertable into the bluetooth adapter for receiving and transmitting audio signals. The bluetooth adapter comprises a receptacle, a hole disposed in communication with the receptacle at one lateral side, an electrical connector disposed at an inner side of the receptacle, a clip, which has a middle part pivotally connected to one lateral side of the bluetooth adapter, a front end terminating in a hooked portion and inserted into the hole and movable in and out of the receptacle, and a rear end provided with a button, and a spring member supporting the rear end of the clip on a part of the bluetooth adapter and adapted for providing a biasing force to the clip to force the hooked portion of the clip into the receptacle. The audio transmitter receiver device comprises an insert insertable into the receptacle, a retaining notch disposed at one lateral side of the insert for engagement with the hooked portion of said clip, and an electrical connector disposed at a front side of the insert and electrically connectable to the electrical connector of the bluetooth adapter.

BRIEF DESCRIPTION OF THE DRAWINGS

FIG. 3 is an exploded view of the bluetooth adapter and the audio transmitter receiver device according to the present invention.

FIG. 4 is a bottom view of FIG. 3.

DETAILED DESCRIPTION OF THE PREFERRED EMBODIMENT

Figure 1:
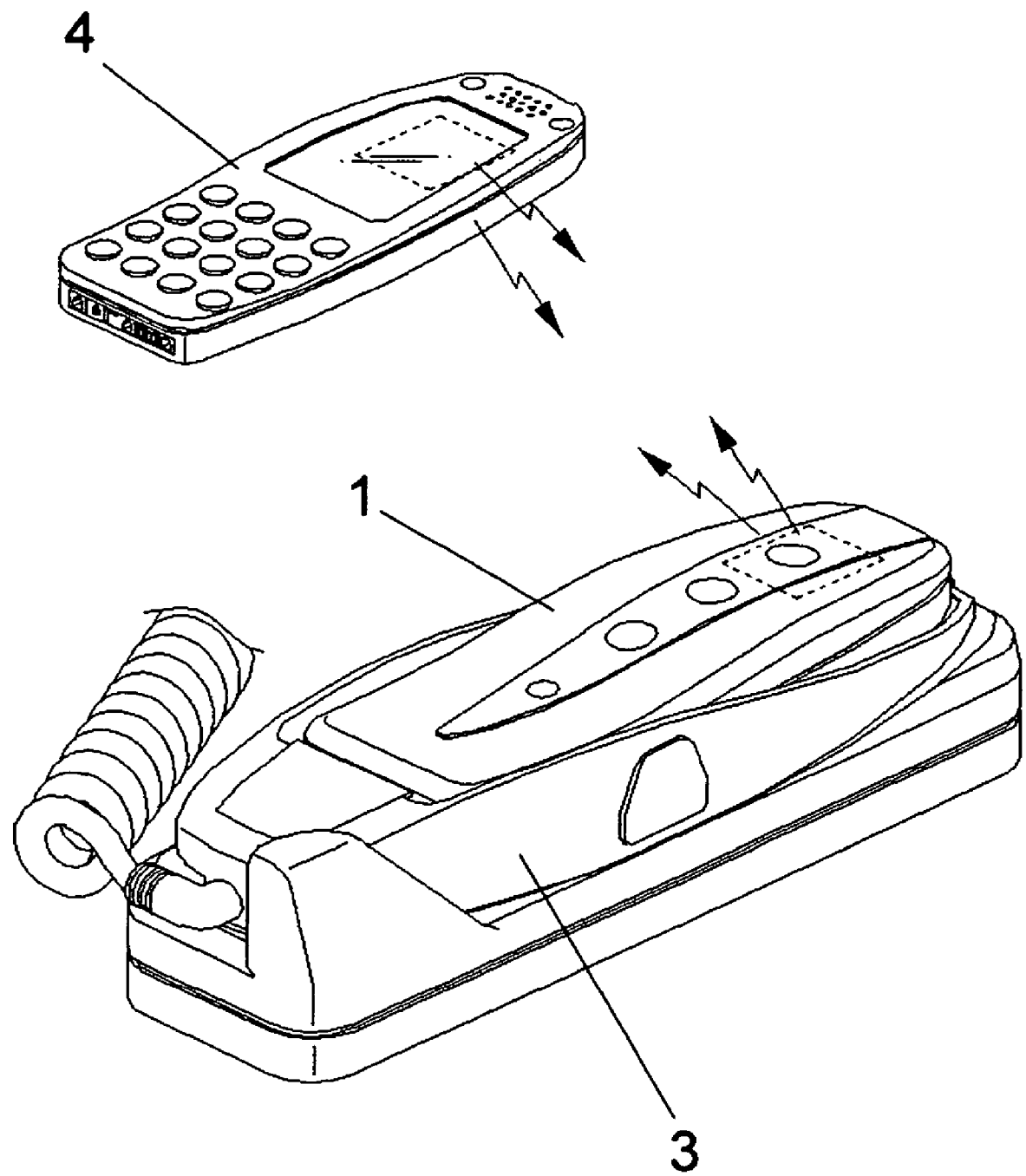
FIG. 1 is a schematic drawing showing an operation status of a bluetooth hands-free car kit in accordance with the present invention.
Figure 2:
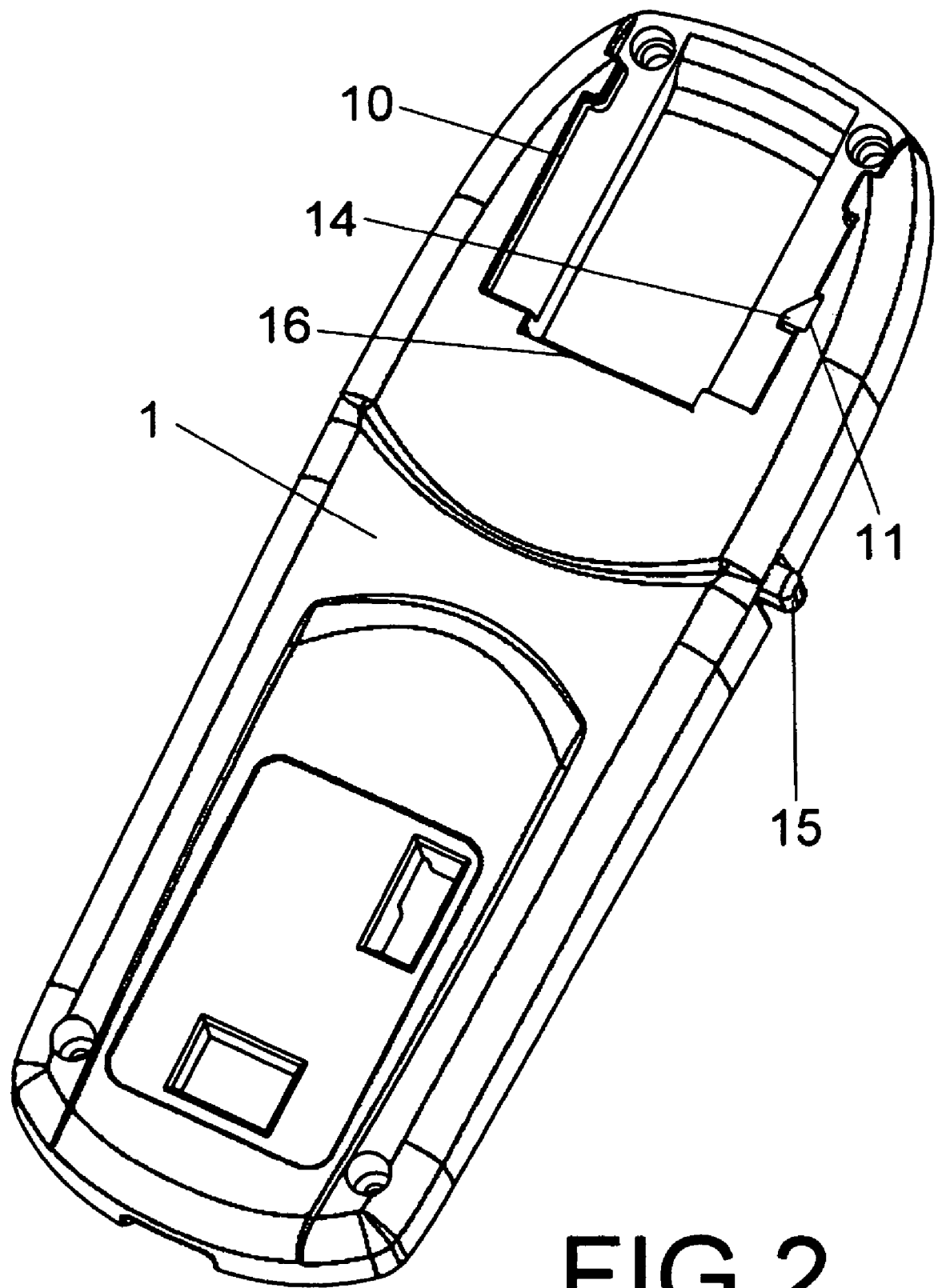
FIG. 2 is an elevational assembly view of the bluetooth adapter of the bluetooth hands-free car kit in accordance with the present invention.
Figure 5:
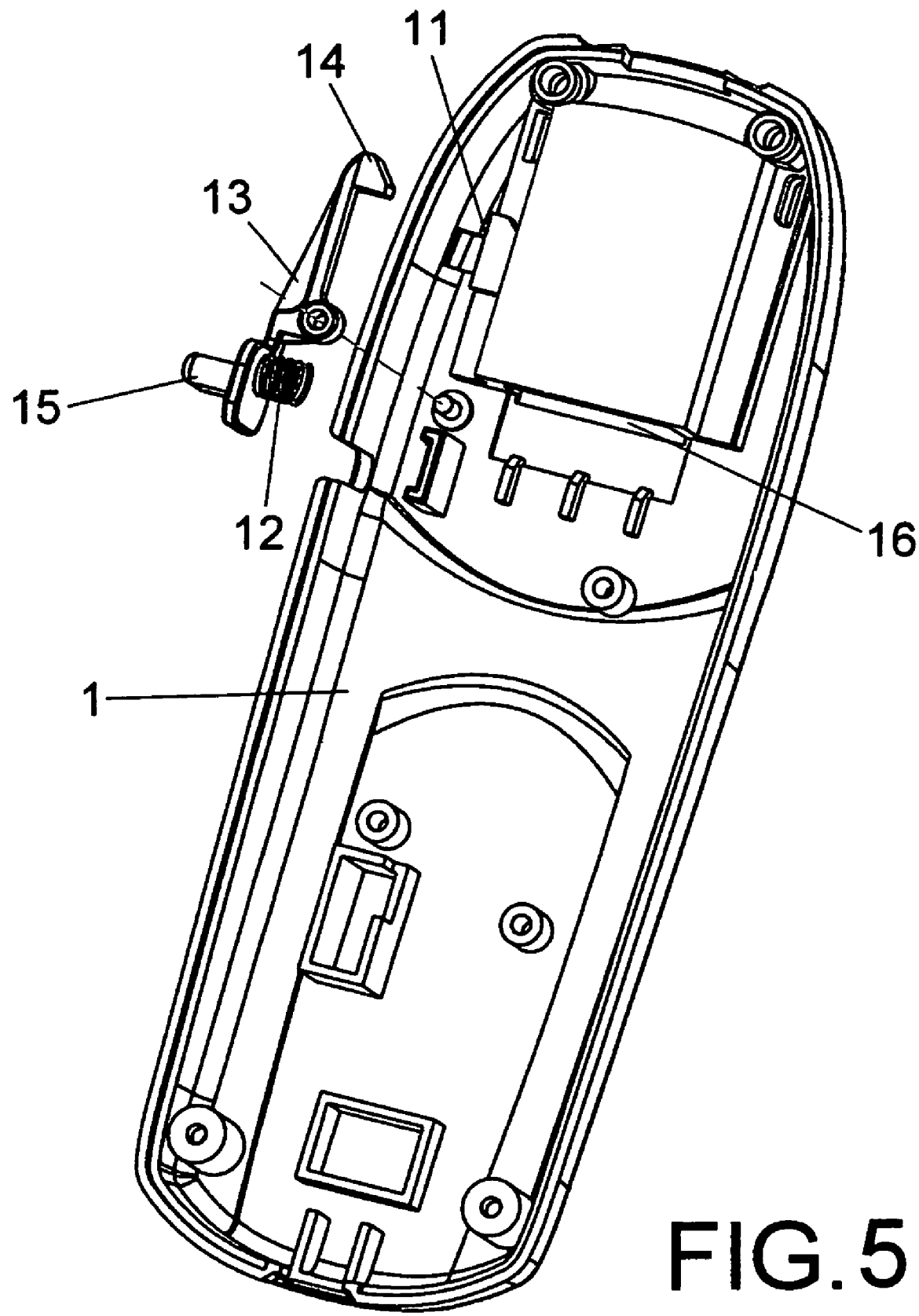
FIG. 5 is an exploded view of the bluetooth adapter according to the present invention.

Referring to FIGS. 1~5, a bluetooth hands-free car kit in accordance with the present invention is shown comprised of a bluetooth adapter 1 and an audio transmitter receiver device 2. The bluetooth adapter 1 is insertable into a hands-free cell phone/PDA holder 3 being electrically connected to the internal electric circuit of a car for receiving and amplifying sound. The bluetooth adapter 1 comprises a receptacle 10, a hole 11 disposed in communication with the receptacle 10 at one lateral side, an electrical connector 16 disposed at the inner side of the receptacle 10, a clip 13, which has a middle part pivotally connected to one lateral side of the bluetooth adapter 1, a front end terminating in a hooked portion 14 that is movable in and out of the hole 11, and a rear end provided with a button 15, and a spring member 12 supporting the rear end of the clip 13 on the peripheral wall of the bluetooth adapter 1. The spring member 12 imparts a biasing force to the rear end of the clip 13, forcing the hooked portion 14 out of the hole 11 into the inside of the receptacle 10. The audio transmitter receiver device 2 comprises an insert 20 insertable into the receptacle 10, a retaining notch 21 disposed at one lateral side of the insert 20 for engagement with the hooked portion 14 of the clip 13, and an electrical connector 22 disposed at the front side of the insert 20 and electrically connectable to the electrical connector 16 of the bluetooth adapter 1.

A cell phone or PDA 4 can be directly inserted into the hands-free cell phone/PDA holder 3 for hands free communication. Alternatively, the bluetooth adapter 1 can be inserted into the hands-free cell phone/PDA holder 3 so that the user can use the cell phone/PDA 4 in a hands free mode by making a bluetooth communication with the bluetooth adapter 1. When inserting the insert 20 of the audio transmitter receiver device 2 into the receptacle 10, the hooked portion 14 of the clip 13 is forced backwards into the inside of the hole 11 by the insert 20 for allowing forward movement of the insert 20 in the receptacle 10 to force the electrical connector 22 into connection with the electrical connector 16 of the bluetooth adapter 1. Immediately after connection of the electrical connector 22 of the audio transmitter receiver device 2 to the electrical connector 16 of the bluetooth adapter 1, the retaining notch 21 is in communication with the hole 11, and the hooked portion 14 of the clip 13 is forced by the biasing force from the spring member 12 into the retaining notch 21, locking the audio transmitter receiver device 2 to the bluetooth adapter 1. When wishing to remove the audio transmitter receiver device 2 from the bluetooth adapter 1, press the button 15 to bias the clip 13, thereby disengaging the hooked portion 14 of the clip 13 from the retaining notch 21 of the audio transmitter receiver device 2 for allowing removal of the audio transmitter receiver device 2 from the bluetooth adapter 1.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A bluetooth hands-free car kit, comprising a hands-free cell phone/PDA holder electrically connected to the internal electric circuit of a car for receiving and amplifying sound, a bluetooth adapter insertable into said hands-free cell phone/PDA holder for wireless communication with a cell phone/PDA through a bluetooth communication technique, and an audio transmitter receiver device insertable into said bluetooth adapter for receiving and transmitting audio signals, wherein:

said bluetooth adapter comprises a receptacle, a hole disposed in communication with said receptacle at one lateral side, an electrical connector disposed at an inner side of said receptacle, a clip, said clip having a middle part pivotally connected to one lateral side of said bluetooth adapter, a front end terminating in a hooked portion and inserted into said hole and movable in and out of said receptacle, and a rear end provided with a button, and a spring member supporting the rear end of said clip on a part of said bluetooth adapter and adapted for providing a biasing force to said clip to force the hooked portion of said clip into said receptacle;

said audio transmitter receiver device comprises an insert insertable into said receptacle, a retaining notch disposed at one lateral side of said insert for engagement with said hooked portion of said clip, and an electrical connector disposed at a front side of said insert and electrically connectable to the electrical connector of said bluetooth adapter.

\* \* \* \* \*